United States Patent Office 3,036,951
Patented May 29, 1962

3,036,951
METHOD OF COMBATING NEMATODES
Hans Disselnkötter, Koln-Poll, and Bernhard Homeyer, Koln-Stammheim, Germany, assignors to Farbenfabriken Bayer Aktiengesellschaft, Leverkusen, Germany, a corporation of Germany
No Drawing. Filed July 7, 1959, Ser. No. 825,421
Claims priority, application Germany July 22, 1958
3 Claims. (Cl. 167—22)

The present invention relates to and has as its object compounds for combating nematodes and methods for applying same.

Halogenated hydrocarbons such as especially 1,3-dichloropropene, 1-chloro-3-bromopropene and 1,2-dibromo-3-chloropropane are best known for combating phytopathogenic soil nematodes.

It has now been found that the 1,2-dibromopentane and 4,5-dibromopentine-1 have an excellent action on all economically important plant-damaging nematodes. Compared with the hitherto best known 1,2-dibromo-3-chloropropane, the compounds according to the invention have an essentially better plant tolerance whilst having at least the same nematicidal activity thus reducing the time which has to be elapsed between application and planting of most cultivated plants by half or more as against the aforesaid compound even at low temperatures of 10 and 15° C.

1,2-dibromopentane and 4,5-dibromo-pentine-1 can easily be formulated by known methods to give liquids or sprays.

Accordingly, the liquid active substance may be applied with the aid of a soil injector or by spraying, and also harrowed or harked into the soil. The compounds to be used according to the invention surprisingly have also fungicidal action.

The following examples are given for illustrating the invention.

Example 1

Soil infected with phytopathogenic nematodes such as *Meloidogyne incognita*, *Heterodera rostochiensis* and *Ditylenchus dipsaci* was treated in Mitscherlich pots of 5 litre capacity with 4,5-dibromopentine-1 in quantities of 5, 10, 15 and 20 p.p.m. The pots were kept at 24° C. and planted with tomatoes and potatoes or sown with rye after 1 week.

The evaluation of the tests was carried out after 5 weeks. The roots of tomatoes and potatoes were tested as to infestation by galls or cysts. The rye plants were tested with the aid of a modified Baermann funnel method on imported rye eels. The degree of efficiency calculated according to the Abbott formula, Journ. Econ. Ent., vol. 18, 1925, 265–267, is indicated in the following tables.

4,5-DIBROMPENTINE-1

|  | 5 p.p.m. | 10 p.p.m. | 15 p.p.m. | 20 p.p.m. |
|---|---|---|---|---|
|  | Percent | Percent | Percent | Percent |
| Meloidogyne incognita | 80 | 100 | 100 | 100 |
| Heterodera rostochiensis | 70 | 95 | 100 | 100 |
| Ditylenchus dipsaci | 89 | 100 | 100 | 100 | for comparison:

1,2-DIBROMO-3-CHLOROPROPANE

|  | 5 p.p.m. | 10 p.p.m. | 15 p.p.m. | 20 p.p.m. |
|---|---|---|---|---|
|  | Percent | Percent | Percent | Percent |
| Meloidogyne incognita | 90 | 100 | 100 | 100 |
| Heterodera rostochiensis | 80 | 98 | 100 | 100 |
| Ditylenchus dipsaci | 95 | 100 | 100 | 100 |

Example 2

1,2-dibromopentane and 1,2-dibromo-3-chloropropane were injected in a strongly infected green house with *Meloidogyne spec.* in quantities of 5, 10, 15 and 20 cc./sq. m. The individual allotments comprised 16 square metres. The refraining period from cultivation amounted to 2 weeks at soil temperatures of 18–20° C. Thereafter cucumbers were planted. After harvesting the cucumbers the roots of each plant were dug out and tested as to infestation. The degree of efficiency was again calculated from the ratio of infestation between treated plants and untreated control.

|  | 5 ccm./m.² | 10 ccm./m.² | 15 ccm./m.² | 20 ccm./m.² |
|---|---|---|---|---|
|  | Percent | Percent | Percent | Percent |
| 1,2-Dibromopentane | 40 | 95 | 100 | 100 |
| for comparison: 1,2-Dibromo-3-chloropropane | 50 | 90 | 100 | 100 |

Example 3

The respective tolerance by plants and the necessary refraining period from cultivation was ascertained by injecting the two compounds in quantities of 10, 20, 30, 40 and 50 cc./sq.m. into each of 12 sq.m.-allotments. The temperature in 5 cm. depth of soil varied between 15 and 21° C. After a refraining period from cultivation of 1 to 2 weeks, lettuce, onions and carrots were sown. The evaluation of plant growth in comparison with the untreated control was carried out in each case after 4 weeks according to the following scheme:

2 means normal plant growth (as in the untreated control)
3 means slight damage to plant growth
4 means strong damage to plant growth
5 means very strong damage to plant growth

|  | 10 g./m.² | 20 g./m.² | 30 g./m.² | 40 g./m.² | 50 g./m.² |
|---|---|---|---|---|---|
| lettuce after 1 week: |  |  |  |  |  |
| 4,5-Dibromopentine-1 | 2 | 2 | 3 | 3 | 4 |
| for comparison—1,2-Dibromo-3-chloro-propane | 3 | 3 | 4 | 5 | 5 |
| control | 2 | 2 | 2 | 2 | 2 |
| lettuce after 2 weeks: |  |  |  |  |  |
| 4,5-Dibromopentine-1 | 2 | 2 | 2 | 3 | 4 |
| for comparison—1,2-Dibromo-3-chloro-propane | 2 | 2 | 3 | 4 | 4 |
| control | 2 | 2 | 2 | 2 | 2 |
| onions after 1 week: |  |  |  |  |  |
| 4,5-Dibromopentine-1 | 2 | 3 | 3 | 4 | 5 |
| for comparison—1,2-Dibromo-3-chloro-propane | 3 | 4 | 4 | 5 | 5 |
| control | 2 | 2 | 2 | 2 | 2 |
| onions after 2 weeks: |  |  |  |  |  |
| 4,5-Dibromopentine-1 | 2 | 2 | 3 | 4 | 4 |
| for comparison—1,2-Dibromo-3-chloro-propane | 2 | 3 | 4 | 5 | 5 |
| control | 2 | 2 | 2 | 2 | 2 |
| carrots after 1 week: |  |  |  |  |  |
| 4,5-Dibromopentine-1 | 2 | 2 | 2 | 3 | 3 |
| for comparison—1,2-Dibromo-3-chloro-propane | 2 | 2 | 3 | 3 | 4 |
| control | 2 | 2 | 2 | 2 | 2 |
| carrots after 2 weeks: |  |  |  |  |  |
| 4,5-Dibromopentine-1 | 2 | 2 | 2 | 2 | 2 |
| for comparison—1,2-Dibromo-3-chloro-propane | 2 | 2 | 2 | 3 | 3 |
| control | 2 | 2 | 2 | 2 | 2 |

We claim:
1. Method of combating nematodes consisting of applying to nematode infested soil a member selected from the group consisting of 4,5-dibromopentine-1 and 4,5-dibromopentane.

2. Method of combating nematodes consisting of applying to nematode infested soil 4,5-dibromopentine-1.

3. Method of combating nematodes consisting of applying to nematode infested soil 4,5-dibromopentane.

References Cited in the file of this patent

UNITED STATES PATENTS

| | | |
|---|---|---|
| 2,415,251 | Leavitt | Feb. 4, 1947 |
| 2,749,377 | Johnson | June 5, 1956 |
| 2,836,536 | Meuli | May 27, 1958 |
| 2,849,365 | Youngson | Aug. 26, 1958 |
| 2,875,118 | Turner | Feb. 24, 1959 |
| 2,947,660 | Hoffmann | Aug. 2, 1960 |

FOREIGN PATENTS

| | | |
|---|---|---|
| 124,387 | Australia | June 12, 1947 |

OTHER REFERENCES

Parnell: Brit. J. Pharmacol., 1952, vol. 7, pps. 509–533 (page 514 relied on).